(12) United States Patent
Pfister et al.

(10) Patent No.: US 7,215,340 B2
(45) Date of Patent: May 8, 2007

(54) OBJECT SPACE EWA SPLATTING OF POINT-BASED 3D MODELS

(75) Inventors: Hanspeter Pfister, Arlington, MA (US); Liu Ren, Pittsburgh, PA (US); Matthias B. Zwicker, Gerlikon (CH)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 10/199,141

(22) Filed: Jul. 19, 2002

(65) Prior Publication Data

US 2004/0012603 A1 Jan. 22, 2004

(51) Int. Cl.
*G09G 5/00* (2006.01)
*G06T 17/00* (2006.01)
*G06T 15/40* (2006.01)

(52) U.S. Cl. ............... 345/582; 345/420; 345/422; 345/428; 345/606; 382/154; 382/260

(58) Field of Classification Search ........ 345/418–424, 345/426–428, 581–583, 589, 586, 606, 615, 345/616, 643, 501, 545; 382/260, 265, 154, 382/300

See application file for complete search history.

(56) References Cited

U.S. PATENT DOCUMENTS 6,396,496 B1* 5/2002 Pfister et al. ............... 345/427
6,639,597 B1* 10/2003 Zwicker et al. ............. 345/427
6,674,430 B1* 1/2004 Kaufman et al. ........... 345/419
6,744,435 B2* 6/2004 Zwicker et al. ............. 345/424

OTHER PUBLICATIONS

Zwicker et al., EWA Volume Splatting, IEEE, 2001, pp. 29-36.*
Cohen et al., Hybrid Simplification: Combining Multi-Resolution Polygon and Point Rendering, IEEE, 2001, pp. 37-44.*
Zwicker et al., EWA Splatting, IEEE, Mar. 15, 2002, pp. 223-238.*
Chen et al., POP: A Hybrid Point and Polygon Rendering System for large data, IEEE, 2001, pp. 45-52.*

* cited by examiner

*Primary Examiner*—Wesner Sajous
(74) *Attorney, Agent, or Firm*—Dirk Brinkman; Clifton D. Mueller; Gene V. Vinokur

(57) ABSTRACT

A method renders a 3D model of a graphics object wherein the model includes discrete zero-dimensional points. A first opaque polygon is centered on each point, and the polygon is rendered to obtain depth values of a depth image in a z-buffer. A second polygon is centered on each point. The second polygons are adapted to associated object space EWA resampling filters, and the adapted second polygons are rendered as an image according to the depth values in the depth image.

19 Claims, 12 Drawing Sheets

OBJECT SPACE EWA SPLATTING OF POINT-BASED 3D MODELS

FIELD OF THE INVENTION

The present invention relates generally to rendering graphics models, and more particularly to rendering point-based 3D surface models with surface splatting in a graphics hardware rendering engine.

BACKGROUND OF THE INVENTION

Point-based surface models define a surface of a 3D graphics object by a set of sample points. Point-based rendering generates a continuous image of the discrete sampled surface points. The points on the surface are commonly called surface elements or "surfers" to indicate their affinity with picture elements (pixels) and volume elements (voxels).

A point-based representation has advantages for graphics models with complex topologies in rendering applications where connectivity information is not required or available, or for fusion of data from multiple sources, see for example, Levoy et al., "The Use of Points as Display Primitives," Technical Report TR 85-022, The University of North Carolina at Chapel Hill, Department of Computer Science, 1985, Zwicker et al., "Surface Splatting," SIGGRAPH 2001 Proceedings, pp. 371–378, 2001, and U.S. Pat. No. 6,396,496 issued to Pfister et al. on May 28, 2002 "Method for modeling graphical objects represented as surface elements," incorporated herein by reference.

Point-based models can be acquired directly using 3D scanning techniques, or by conversion from polygon models with textures, see Levoy et al., "The Digital Michelangelo Project: 3D Scanning of Large Statues," SIGGRAPH 2000 Proceedings, pp. 131–144, 2000, and Pfister et al., "Surfels: Surface Elements as Rendering Primitives," SIGGRAPH 2000 Proceedings, pp. 335–342, 2000.

Most prior art point-based rendering methods have focused on efficiency and speed. Some of those methods use OpenGL and hardware acceleration to achieve interactive rendering performances of two to five million points per second, see Rusinkiewicz et al., "QSplat: A Multiresolution Point Rendering System for Large Meshes, SIGGRAPH 2000 Proceedings, pp. 343–352, 2000, and Stamminger et al., "Interactive Sampling and Rendering for Complex and Procedural Geometry," Proceedings of the $12^{th}$ Eurographics Workshop on Rendering, pp. 151–162, 2001.

However, none of those techniques supports anti-aliasing for models with complex surface textures. Recently, Zwicker et al. described elliptical weighted average (EWA) surface splatting, see Zwicker et al. "Surface Splatting," SIGGRAPH 2001 Proceedings, pp. 371–378, 2001, and U.S. patent application Ser. No. 09/842,737 "Rendering Discrete Sample Points Projected to a Screen Space with a Continuous Resampling Filter," filed by Zwicker et al., on Apr. 26, 2001, incorporated herein by reference.

Those methods uses anisotropic texture filtering and an image-space formulation of an EWA texture filter adapted for irregular point samples, see Greene et al., "Creating Raster Omnimax Images from Multiple Perspective Views Using the Elliptical Weighted Average Filter," IEEE Computer Graphics & Applications, 6(6):21–27, 1986, and Heckbert, "Fundamentals of Texture Mapping and Image Warping," Master's Thesis, University of California at Berkeley, Department of Electrical Engineering and Computer Science, 1989.

However, a software implementation of EWA surface splatting only achieves a rendering performance of up to about 250,000 points per second.

Polygon and point primitives can also be combined into efficient rendering systems that select one or the other based on image space projection criteria, see Chen et al., "POP: A Hybrid Point and Polygon Rendering System for Large Data," Proceedings of IEEE Visualization, pp. 45–52, 2001, and Cohen et al., "Hybrid Simplification: Combining Multi-Resolution Polygon and Point Rendering," Proceedings of IEEE Visualization, pp. 37–44, 2001. Both of those systems make use of graphics hardware to achieve real-time performance for reasonably complex models. However, neither system handles surface textures, and the introduction of connectivity information further diminishes the advantages of pure point-sampled models.

Image Space EWA Splatting

In the image space EWA splatting framework as described by Zwicker et al., objects are represented by a set of irregularly spaced points $\{P_k\}$ in three dimensional object space without connectivity information, in contrast with polygon or triangle models which do contain adjacency or connectivity information.

Each zero-dimensional point is associated with a location, a surface normal, a radially symmetric basis function $r_k$, and scalar coefficients $w_r^k$, $w_g^k$, $w_b^k$ that represent continuous functions for red, green, and blue color components. The basis functions $r_k$ are reconstruction filters defined on locally parameterized domains. Hence, the functions define a continuous texture function on the model's surface as represented by the discrete points.

FIG. 1 shows a local parameterization 101 from 3D object space 102 to 2D image space 103. The color of a neighborhood of any point Q 104 with local coordinates u is evaluated by accumulating the basis functions $r_k$ 105 yielding a continuous texture function $f_c(u)$ as the weighted sum $$f_c(u) = \sum_{k \in N} w_k r_k(u - u_k), \tag{1}$$

where $u_k$ is the local coordinate of each point $P_k$.

In the ideal resampling framework described by Heckbert et al., rendering the texture function $f_c(u)$ yields a continuous output function $g_c(x)$ in image space that respects the Nyquist criterion of the output pixel grid. Thus, aliasing artifacts are avoided. The rendering process includes the following steps.

First, the texture function $f_c(u)$ is warped to image space using a local affine mapping of the perspective projection at each point. Then the continuous image space signal is band-limited by convolving it with a prefilter h, yielding the output function $g_c(x)$, where x are image space coordinates. After rearranging the mathematical expressions, the output function can be expressed as a weighted sum of image space resampling filters $\rho_k$ x:

$$\rho_k(x) = (r'_k \otimes h)(x - m_k(u_k)). \tag{3}$$

where $$g_c(x) = \sum_{k \in N} w_k \rho_k(x), \tag{2}$$

Here, the resampling filter $\rho_k x$ is written as a convolution of a warped basis function $r_k'(x) = r_k(x)(m^{-1}(x))$, and the prefilter $h(x)$.

To simplify the evaluation of $\rho_k$ at each point $u_k$, a local affine approximation $x = m_k(u)$ of the projective mapping $x = m(u)$ from the local surface parameterization to image space is used. The local affine approximation $m_k$ is $$m_k(u) = x_k + J_k(u - u_k), \quad (4)$$

given by the Taylor expansion of m at $u_k$, truncated at the linear term:

where $x_k = m(u_k)$ and the Jacobian $$J_k = \frac{\partial m}{\partial u}(u_k) \in \mathbb{R}^{2 \times 2}.$$

In the EWA framework, elliptical Gaussians are selected as basis functions $r_k$ and as pre-filters h because of their unique properties. Gaussians are closed under affine mappings and convolution. Hence, the resampling filter $\rho_k$ can be expressed as an elliptical Gaussian, as described below. A 2D elliptical Gaussian $G_V(x)$ with variance matrix $V \in \mathbb{R}^{2 \times 2}$ is defined as $$G_V(x) = \frac{1}{2\pi |V|^{\frac{1}{2}}} e^{-\frac{1}{2} x^T V^{-1} x},$$

where $|V|$ is the determinant of V. The variance matrices of the basis functions $r_k$ and the low-pass filter h are defined with $V_k^k$ and $V^h$, hence $r_k = G_{V_k'}$ and $h = G_{V^h}$, respectively.

Note that a typical choice for the variance of the low-pass filter is the identity matrix I. By substituting the Gaussian basis function and prefilter in Equation (3), a Gaussian resampling filter $$\rho_k(x) = \frac{1}{|J_k^{-1}|} G_{J_\lambda V_\lambda^r J_\lambda^T + I}(x - m_k(u_k)), \quad (5)$$

can be obtained, which is called an image space EWA resampling filter, for additional details see Zwicker et al.

Image space filters are suitable for software implementations. However, hardware graphics engines cannot determine such filters directly in image space. Hence the rendering performance is severely degraded, e.g., by an order of magnitude or more, as indicated above.

Therefore, it is desired to provide a rendering system that interactively renders complex point-based models with arbitrary surface textures at a highest possible quality. The rendering system should take advantage of advances in PC graphics hardware, namely, the ever increasing performance of graphic processing units (GPUs), and programmable shading. The system should also provide anisotropic texture filtering.

SUMMARY OF THE INVENTION

Elliptical weighted average (EWA) surface splatting is a technique for high quality rendering of point sampled 3D objects. EWA surface splatting renders water-tight surfaces of complex point models with high quality, anisotropic texture filtering. The invention provides a method for EWA surface splatting using modem PC graphics hardware.

The invention provides an object space formulation of the EWA filter which is adapted for accelerated rendering by conventional triangle-based graphics rendering hardware. The object space EWA filter is rendered using programmable vertex and pixel shaders, fully exploiting the capabilities of today's graphics processing units (GPUs). The method according to the invention renders several million points per second on current PC graphics hardware, an order of magnitude more than a pure software implementation of EWA surface splatting of the prior art.

DETAILED DESCRIPTION OF THE PREFERRED EMBODIMENT

System Architecture

Figure 10:
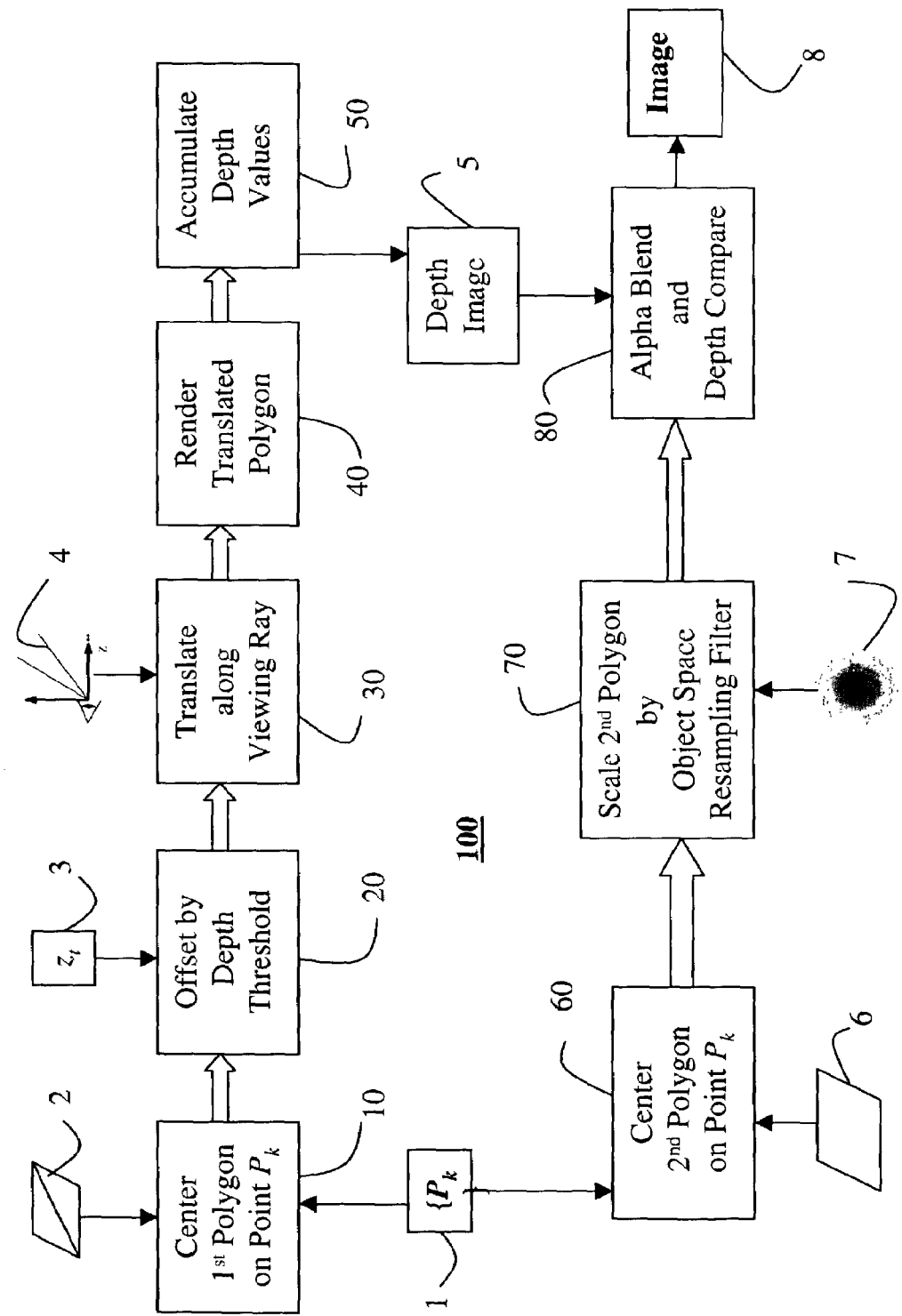
FIG. 10 is a block diagram of a hardware accelerated rendering system and method for point-based graphics models according to the invention.

FIG. 10 shows a hardware accelerated rendering system and method 100 according to our invention. The method renders a 3D point-based graphics model as an image 8 using object space elliptical weighted average (EWA) surface splatting. The 3D model can be constructed of discrete zero-dimensional surface points (surfers) $p_k$ 1. Each point 1 has a 3D location, a surface normal, and a color. These values can be obtained by sampling, or they can be generated procedurally. Alternatively, the points can be vertices of a polygon-based model. As described in greater detail below, each point also has an associated object space EWA resampling filter. The rendering of the image 8 of the model 1 is done in one or more passes.

During a first pass, a first polygon 2, e.g., in the form of a quadrilateral (quad), is centered 10 on each point $P_k$ 1 (or each vertex of a triangle in a polygon mesh). The plane of the quad 2 is perpendicular to the point's surface normal. The quad 2 is then offset 20 and translated 30 by a depth threshold $z_t$ 3 along a viewing ray 4 to avoid occlusions. The depth-offset and translated quads are then rendered 40 using hardware rasterization of a conventional graphic processing units (GPU). The rendering accumulates 50 depth values of the opaque quads in a z-buffer as a depth image 5. The accumulation only retains depth values for pixels that are closest to the point of view, and discards all other (occluded) depth values. The depth image 5 is used later to only render pixels representing visible portions of the 3D model 1.

Figure 6:
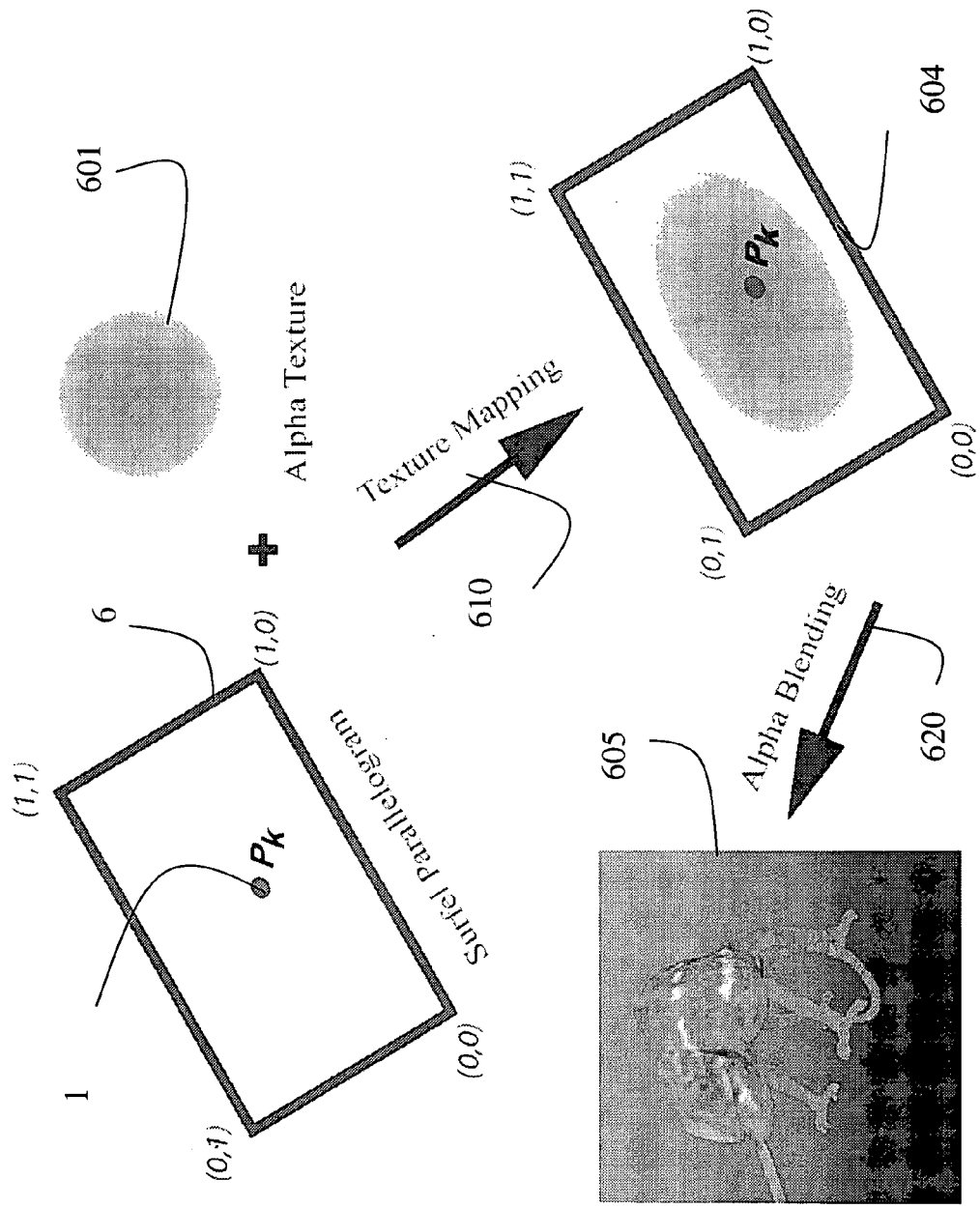
FIG. 6 is a flow diagram of EWA splatting using a textured polygon during rendering according to the invention.

During a second pass, as shown in FIG. 6, a second polygon 6, e.g., in the form of a parallelogram, is centered 60 on each point $P_k$1. The parallelogram 6 is stretched and scaled 70 to adapt the polygon to an object space EWA resampling filter 7. The adapted polygon is then rasterized and alpha blended 80, according to the depth values of the depth image 5, to form the final output image 8.

It should be noted that the rendering can be done in a single pass when two depth buffers are used, one storing the actual depth values, and the other storing the offset depth values. It should also be noted that normalization can be performed in another pass. It should also be noted that the first and corresponding second polygon for each point can be the same.

The method and system are now described in greater detail.

Object Space EWA Splatting

In Equation (3), given above, the resampling filter is expressed as a function of image or screen space coordinates x, which is suitable for software implementations. However, hardware graphics engines cannot compute such a filter directly in image space. To make EWA splatting amenable to acceleration by graphics hardware, as desired by the invention, we formulate the resampling filter as a function on a parameterized surface in object space. Then, we can exploit graphics hardware to project the model's surface to image space, yielding the resampling filter in image space as in (3).

To do this, we rearrange Equation (3) using a local affine approximation $m_k$:

$$\rho_k(x) = (r'_k \otimes h)(x - m_k(u_k)) \quad (6)$$
$$= (r'_k \otimes h)(m_k(m_k^{-1}(x)) - m_k(u_k))$$
$$= (r'_k \otimes h)(J_k(m_k^{-1}(x) - u_k))$$
$$= (r_k \otimes h')(u - u_k) = \rho'_k(u),$$

yielding an object space resampling filter $\rho'_k$ defined in coordinates u of the local surface parameterization. Note that in contrast to the image space resampling filter, the object space resampling filter according to the invention includes a convolution of the original basis function $r_k(u)$, and a warped (low-pass) prefilter $h'_k(u) = |J_k| h(J_k(u))$.

Figure 1:
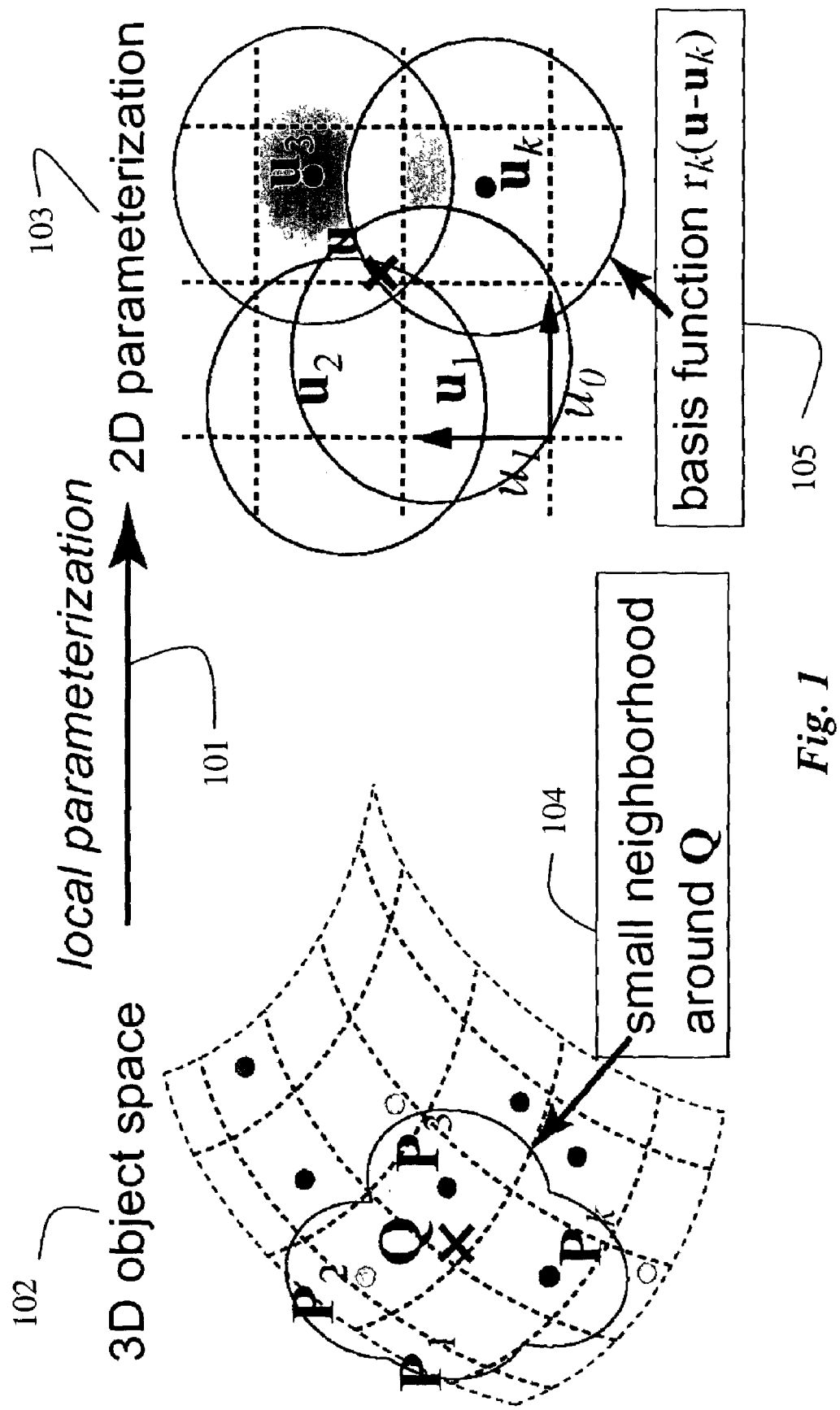
FIG. 1 is a diagram of a prior art local parameterization of 3D object space.
Figure 2A:
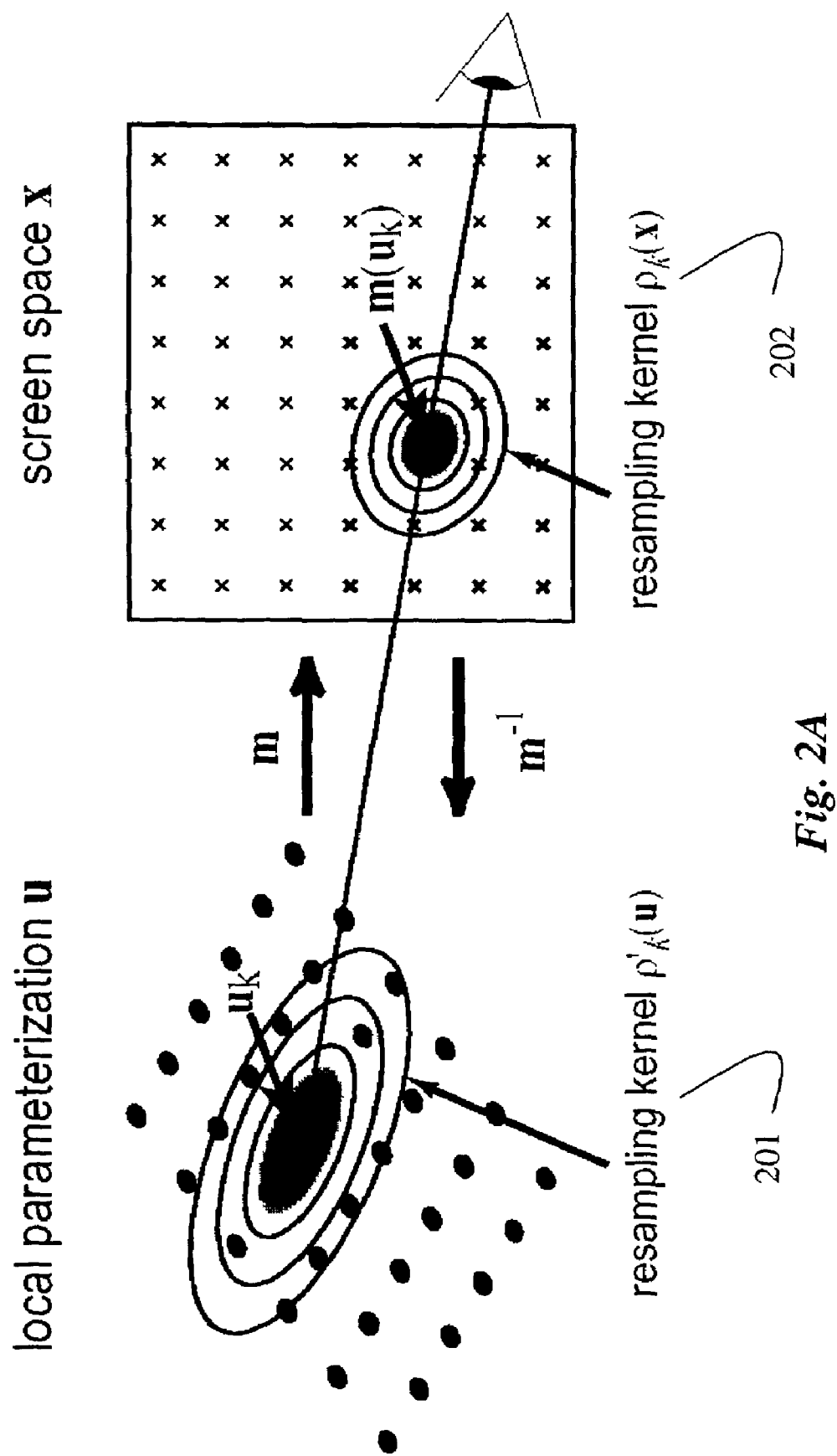
FIG. 2A is a diagram of a conversion of a resampling filter between object space and image or screen space.

As shown in FIG. 2A, the conversions (m and $m^{-1}$) between $\rho'_k$ 201 and $\rho_k(u)$ 202 correspond to mappings from object space to image, and projections from object space to image space.

We use Gaussians as basis functions and prefilter in Equation (6). This yields an analogous expression to Equation (5), which we call an object space EWA resampling filter:

$$\rho'_k(u) = G_{V_k^r + J_k^{-1} J_k^{-1T}}(u - u_k). \quad (7)$$

Finally, we use Equations (6) and (7) to reformulate the continuous output function of Equation (2) as a weighted sum of object space EWA resampling filters:

$$g_c(x) = \sum_{k \in N} w_k G_{V_k^r + J_k^{-1} J_k^{-1T}}(m^{-1}(x) - u_k). \quad (8)$$

Figure 2B:
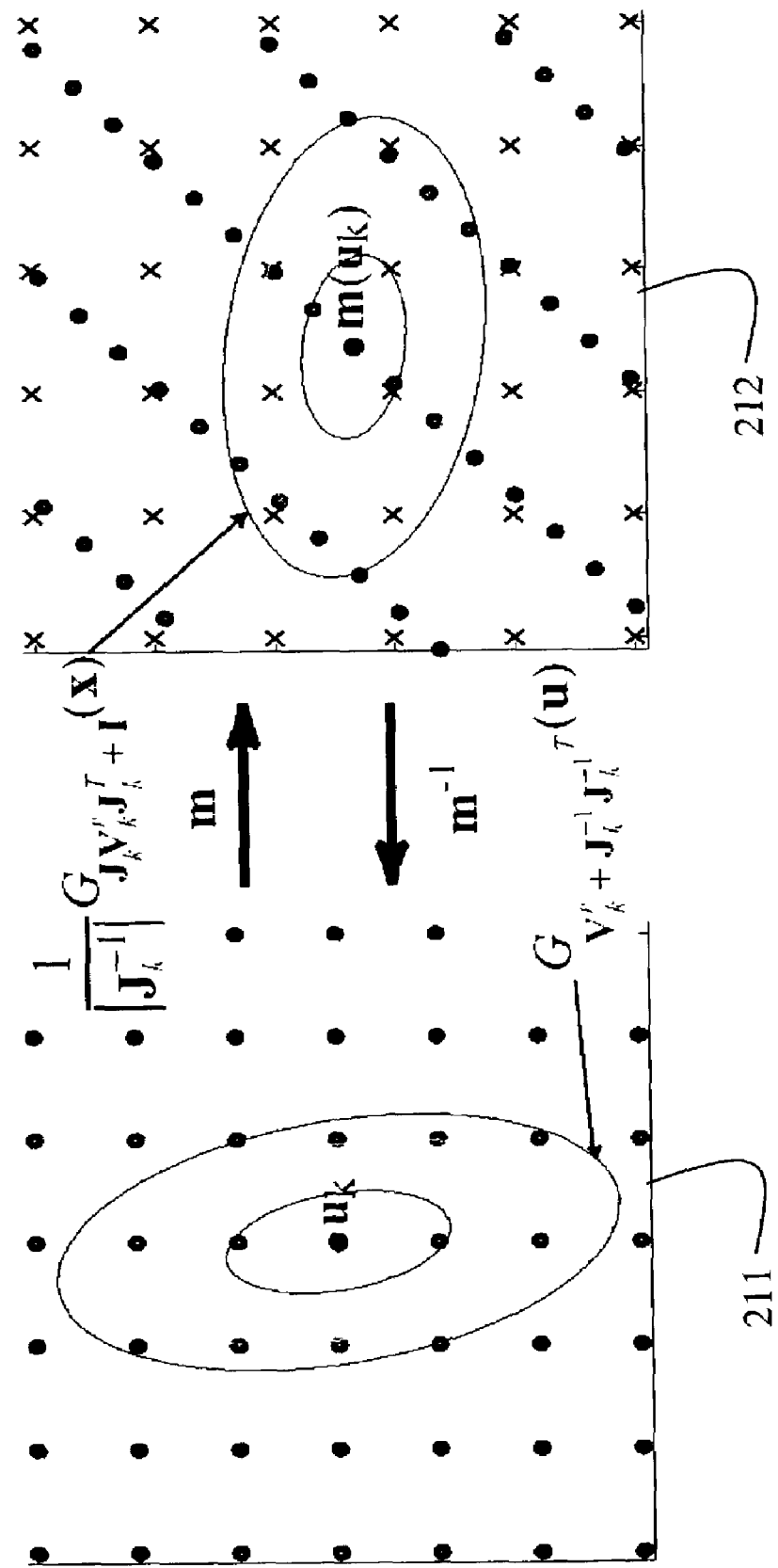
FIG. 2B is a diagram of a conversion of an EWA resampling filter between object space and image or screen space.
Figure 2C:
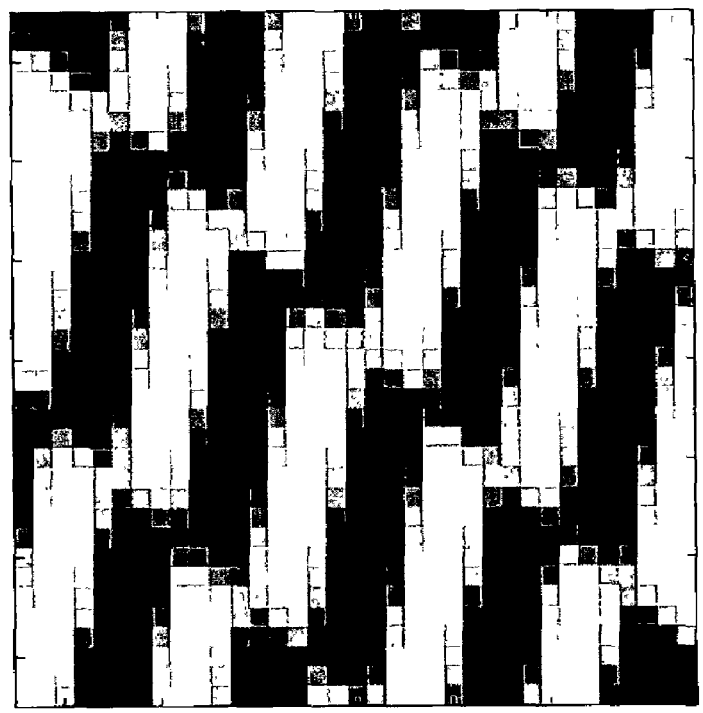
FIG. 2C is a diagram of warping and resampling of checkerboard texture.
Figure 2C:
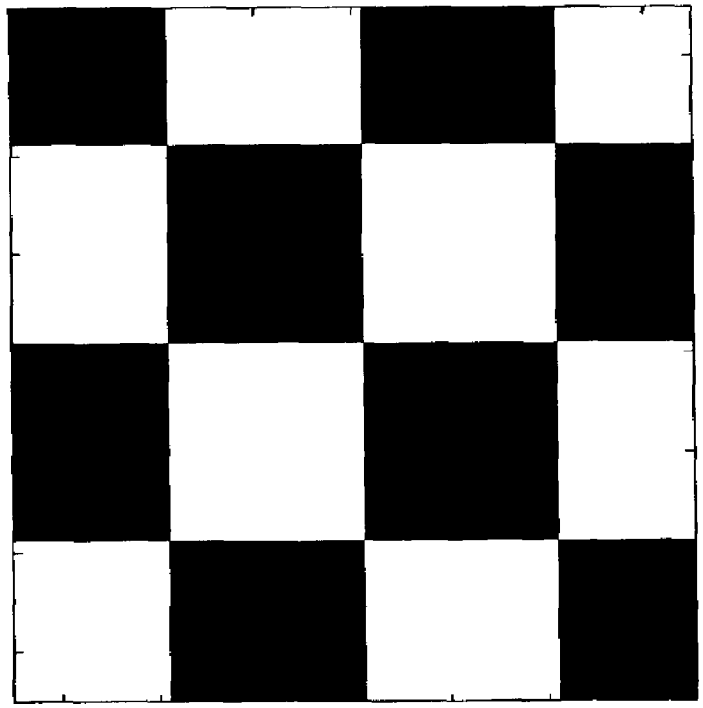

FIG. 2B shows a Gaussian resampling filter 211 in the local surface parameterization and its counterpart in image space 212, and FIG. 2C shows the corresponding warping and resampling of a checkerboard texture.

Hardware Accelerated Rendering

Our hardware accelerated surface splatting algorithm is based on Equation (8) and uses a two-pass approach, emulating an A-Buffer, see Carpenter, "The A-buffer, an Antialiased Hidden Surface Method. In Computer Graphics," Volume 18 of SIGGRAPH Proceedings, pages 103–108, 1984.

The first pass, described below in greater detail, performs visibility splatting by rendering an opaque polygon as depth (z) values for each point into the Z-buffer of depth image 5. The second pass performs the operations of Equation (8) as follows.

As shown in FIG. 6, we set up the object space EWA resampling filter as a polygon 604 with a semi-transparent alpha texture 601 using texture mapping 610. We use a programmable vertex shader that is found in most modern GPUs. The projection of the textured polygon to image space then yields the image space EWA resampling filter, which we call the EWA splat. The splats are evaluated at pixel centers, multiplied with the color $W_r^k$, $W_g^k$, $W_b^k$ of the current point, and the resulting values are accumulated in each pixel.

During rasterization, we perform depth tests using the depth values in the Z-buffer or depth image 5 that was generated during the first rendering pass to determine whether the splats are visible. This ensures that for each pixel only those splats that represent the surface closest to the viewer are accumulated.

In contrast with the prior art, our point-based rendering uses semi-transparent splats with antialiasing, and a textured polygon to represent each point 1. Also, in the prior art approach, the position of each polygon in object space is static, i.e., determined before rendering. In contrast, we dynamically determine view dependent point positions during rendering to avoid aliasing, as described below.

Visibility Splatting

Figure 3:
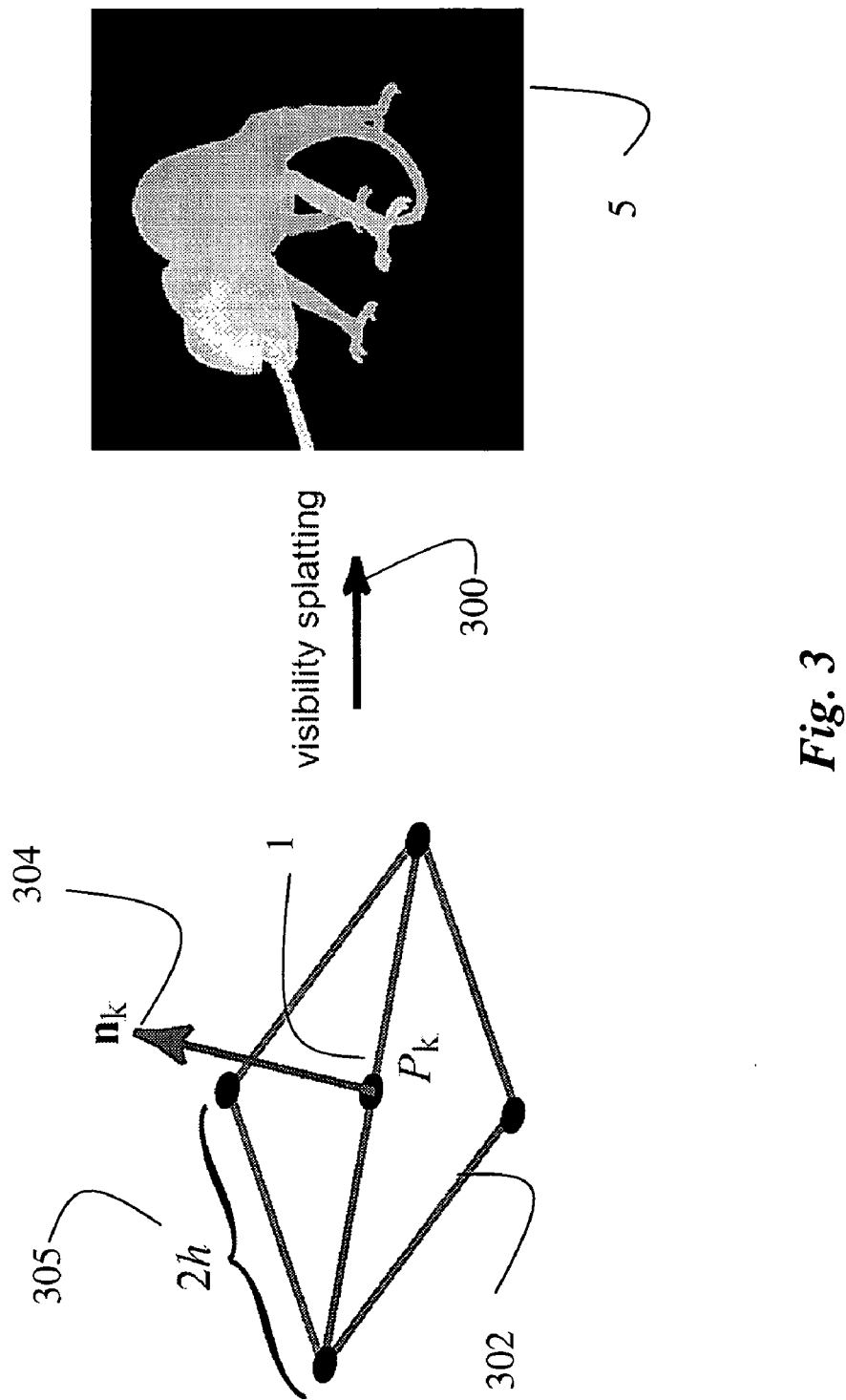
FIG. 3 is a diagram of visibility splatting during rendering according to the invention.

As shown in FIG. 3, the purpose of visibility splatting 300, during the first pass, is to render the depth image 5 of the object into the Z-buffer such that the depth image does not contain any "holes." An image without holes is said to be "watertight." The depth image 5 is used to control the accumulation of the semi-transparent splats in the second rendering pass, as described below. We center an opaque quadrilateral 302 at each point $P_k$ 1, perpendicular to the normal $n_k$ 304 of the point. The quadrilateral 302 is rasterized into the Z-buffer only, without modifying other frame buffer attributes. To avoid holes in the depth image 5, the side length of the quadrilateral is selected as 2h 305, where h is a maximum distance between points in a small neighborhood around the point $P_k$ 1.

To render a point based model of an object without artifacts, we must accumulate all the splats of the visible surface closest to the viewer while discarding all other splats. During rasterization of the splats, we decide for each pixel whether to discard or accumulate the current contribution by comparing the depth value of the splat with the depth image 5 that was generated as described above. However, to prevent contributions of the visible surface from being accidentally discarded, the depth image is translated away from the viewpoint by a small depth threshold $z_t$.

A simple solution is to translate the depth image 5 by $z_t$ along the z-axis in camera space, as described by Rusinkiewicz et al., "QSplat: A Multiresolution Point Rendering System for Large Meshes," SIGGRAPH 2000 Proceedings, pages 343–352, 2000.

Figure 4B:
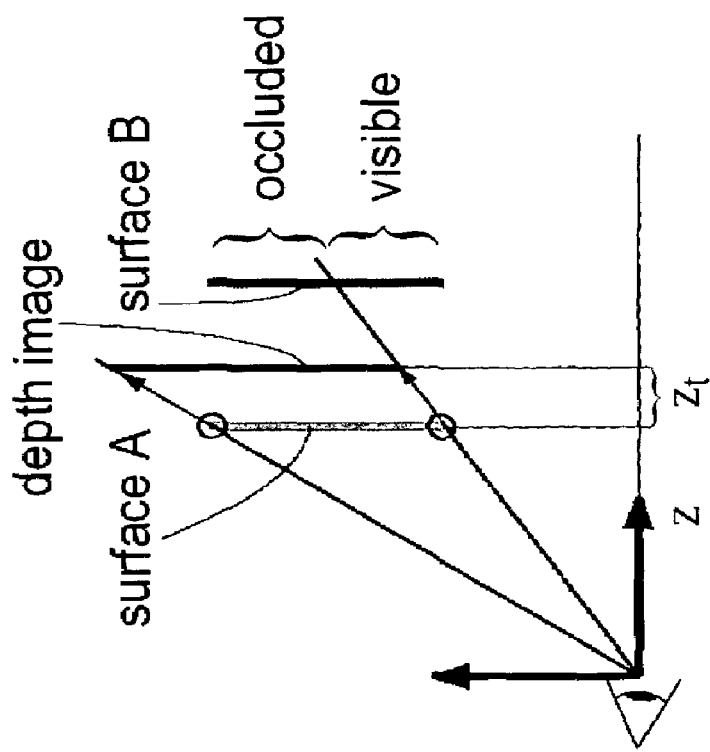
FIG. 4B is a diagram of a depth offset and translation along a viewing ray according to the invention.
Figure 4A:
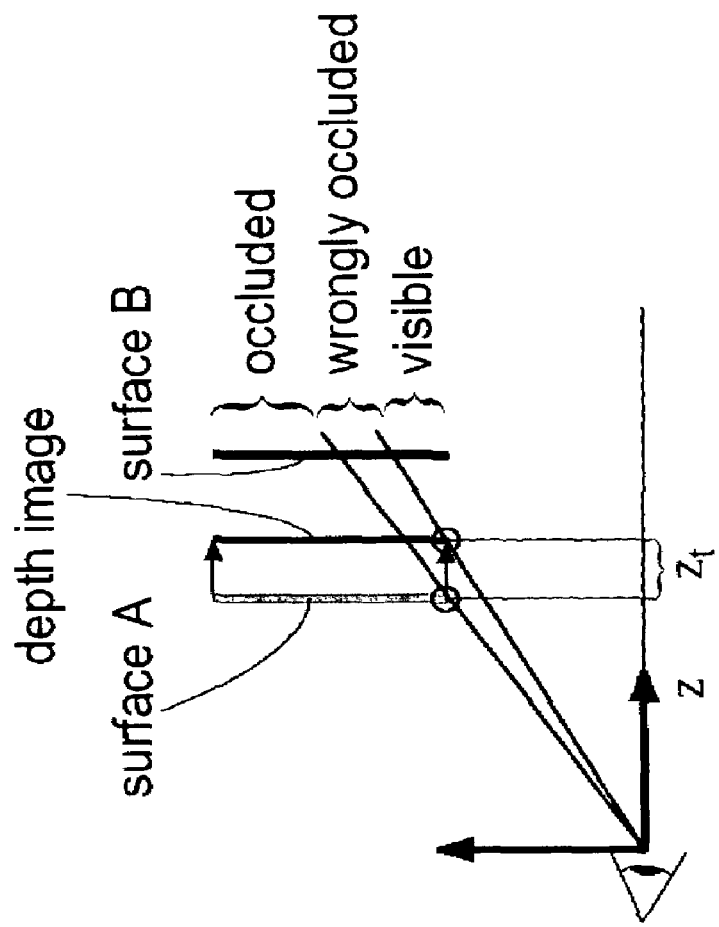
FIG. 4A is a diagram of a prior art depth offset and along a z-axis.

However, as shown in FIGS. 4A, this leads to occlusion artifacts. FIG. 4A shows translation along the z-axis of camera space. Surface B is partially occluded by surface A. However, the depth image generated by translating A along the camera space z-axis wrongly occludes additional regions of B. FIG. 4B shows the translation along viewing rays according to the invention. Visibility splatting can still discard visible surfaces if $z_t$ is too small, or lead to the blending of several surfaces if $z_t$ is too big. A good choice for $z_t$ is the average distance between the points.

Figure 5B:
FIG. 5B is an image without occlusions according to the depth offset of FIG. 4B.
Figure 5A:
FIG. 5A is a prior art image produced according to the depth offset of FIG. 4A.

FIG. 5A shows an example image with occlusion artifacts in areas close to object silhouettes. We avoid these problems by translating the depth image along the viewing rays instead, as shown in FIG. 4B. As a consequence, the same region in surface B is occluded by surface A and the depth image, and no occlusion artifacts appear in the example image as shown in FIG. 5B.

Determining Object Space EWA Resampling Filter

Figure 7:
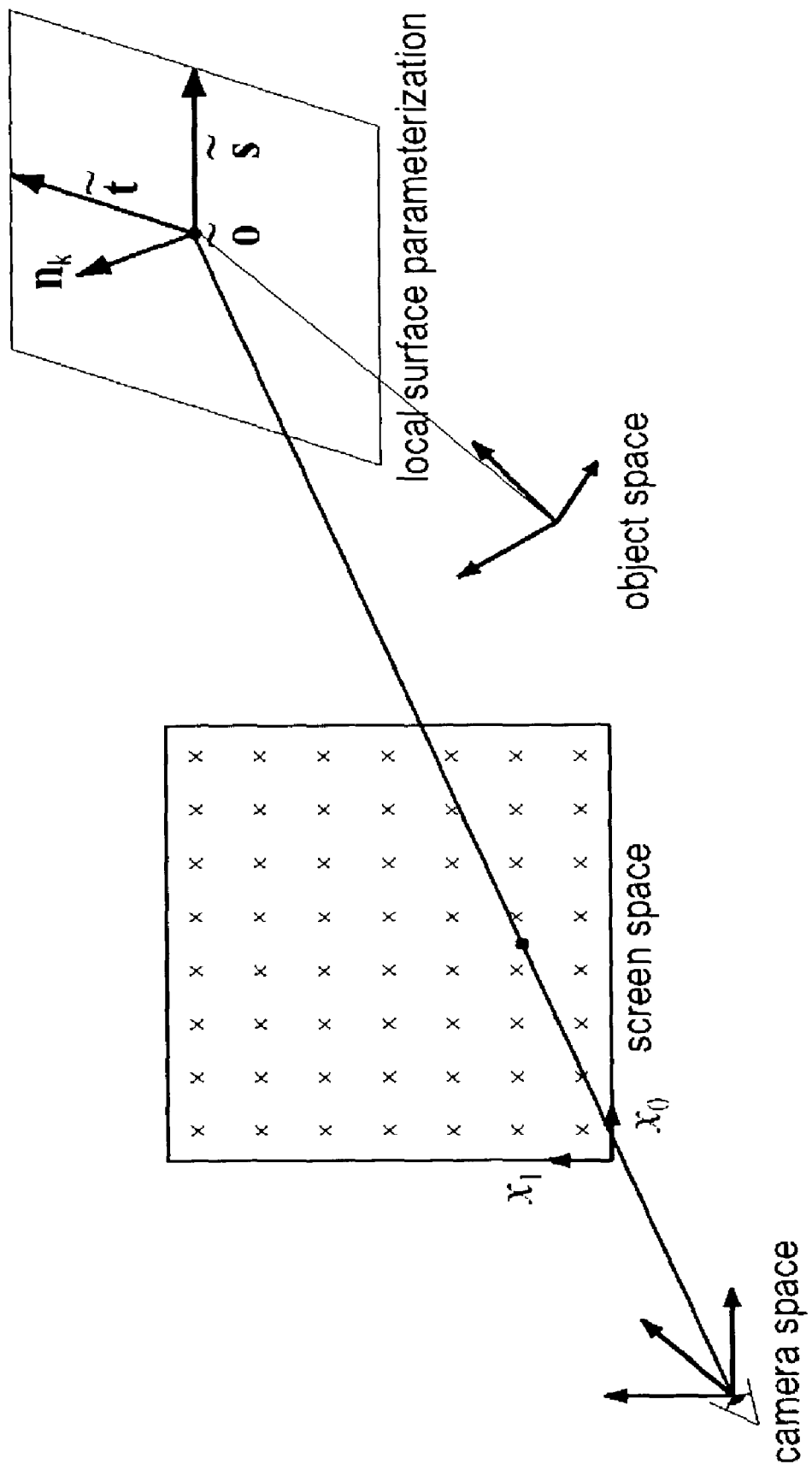
FIG. 7 is a diagram depicting determination of an object space EWA resampling filter according to the invention.

FIG. 7 shows the steps of evaluating a Jacobian $J^{-1}_k$ to determine the object space EWA resampling filter $\rho'_k$ of Equation (7). First, we derive an analytical form of $J_k$ that maps the coordinates u of the local surface parameterization to viewport coordinates x, and then we determine its inverse. Our approach avoids ray casting and can be determined with a small number of operations.

We construct a local parameterization of the object surface around the point $P_k$ 1 by approximating the surface with its tangent plane given by the normal $n_k$. The parameterization is defined by selecting two orthogonal basis vectors $\tilde{s}$ and $\tilde{t}$ in this plane, attached to the position $\tilde{o}$ of the point $P_k$. Note that $\tilde{s}$, $\tilde{t}$, and $\tilde{o}$ are 3×1 vectors defined in object space. Hence, a point u with components $u_0$ and $u_1$ in local surface coordinates corresponds to a point $p_o(u)=\tilde{o}+u_0\cdot\tilde{s}+u_1\tilde{t}$ in object space.

If we assume that the transformation from object space to camera space only contains uniform scaling S, rotation R and translation T, then a point u corresponds to the following point $p^c(u)$ in camera space:

$$p^o(u) = R \cdot S \cdot p^o(u) + T \quad (9)$$
$$= (R \cdot S \cdot \tilde{o} + T) + u_s \cdot R \cdot S \cdot \tilde{s} + u_t \cdot R \cdot S \cdot \tilde{t}$$
$$= o + u_s \cdot s + u_t \cdot t,$$

where o is the point position in camera space, while s and t are the basis vectors defining the local surface parameterization in camera space.

Next, we map the points from camera space to image or screen space. This includes the projection to the image plane by perspective division, followed by a scaling with a factor $\eta$ to image coordinates, i.e., a viewport transformation. The scaling factor $\eta$ is determined by the view frustum as follows:

$$\eta = z_{near} \cdot \frac{v_h}{2z_{near} \cdot \tan\left(\frac{fov}{2}\right)} = \frac{v_h}{2\tan\left(\frac{fov}{2}\right)},$$

where $v_h$ stands for the viewport height, fov is the field of view of the viewing frustum, and $Z_{near}$ specifies the near clipping plane. Hence, image space coordinates $x=(x_0, x_1)$ of the projected point $(u_0, u_1)$ are determined as $$x_0 = \eta \cdot \frac{o_x + u_s \cdot s_x + u_t \cdot t_x}{o_z + u_s \cdot s_z + u_t \cdot t_z} + c_0 \quad (10)$$
$$x_1 = -\eta \cdot \frac{o_y + u_s \cdot s_y + u_t \cdot t_y}{o_z + u_s \cdot s_z + u_t \cdot t_z} + c_1.$$

So the Jacobian $J_k$, including the partial derivatives of Equation (10) evaluated at $(u_0, u_1)=(0, 0)$, is $$J_k = \begin{bmatrix} \frac{\partial x_0}{\partial u_s} & \frac{\partial x_0}{\partial u_t} \\ \frac{\partial x_1}{\partial u_s} & \frac{\partial x_1}{\partial u_t} \end{bmatrix}(0, 0)$$
$$= \eta \cdot \frac{1}{o_z^2}\begin{bmatrix} s_x \cdot o_z - s_z \cdot o_x & t_x \cdot o_z - t_z \cdot o_x \\ s_z \cdot o_y - s_y \cdot o_z & t_z \cdot o_y - t_y \cdot o_z \end{bmatrix}.$$

Determining Point Parallelogram Vertex Position

After the Jacobian matrix is determined, the object space EWA resampling filter defined on the locally parameterized surface is written as:

$$\rho'_k(u)=G_{M_k}(u) \text{ where } M_k=V_k^r+J_k^{-1}J_k^{-1^T}.$$

Figure 8B:
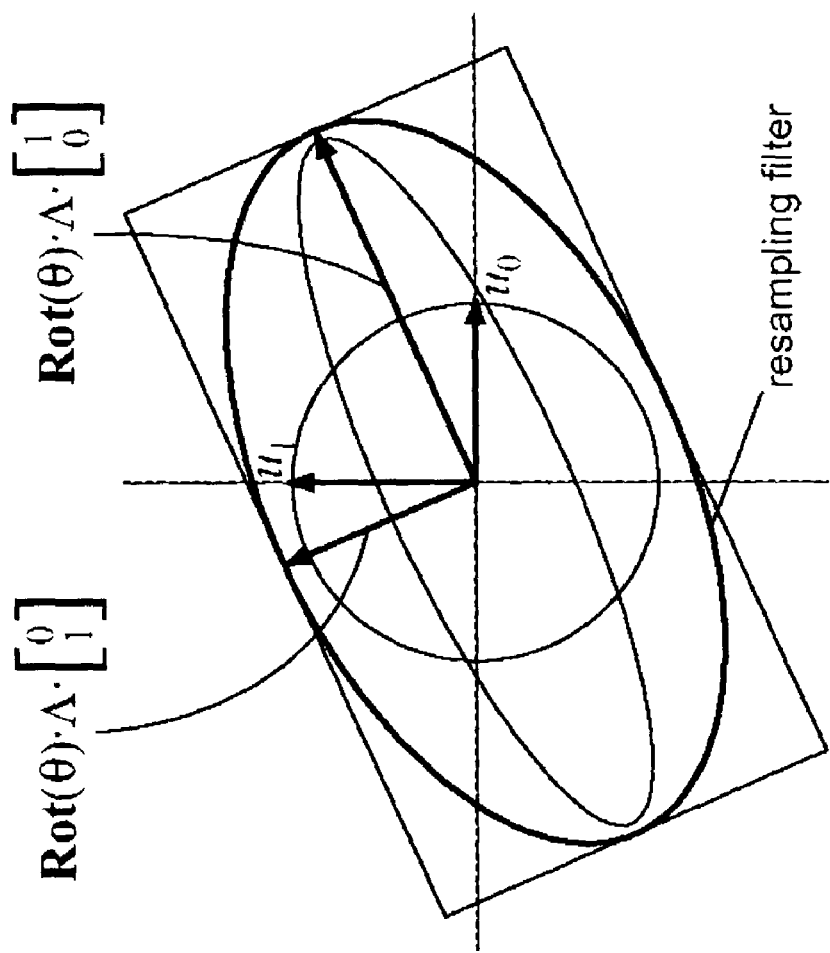
FIG. 8B is a diagram of a mapping of the filter of FIG. 8A from a unit circle to an ellipse.
Figure 8A:
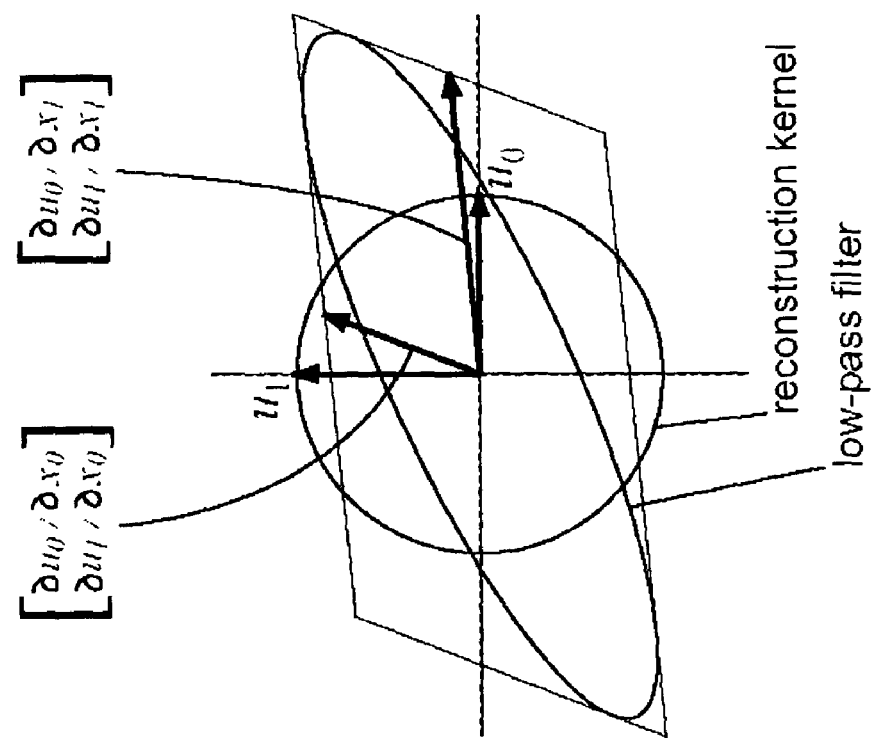
FIG. 8A is a diagram of unit circle reconstruction kernel and a warped low-pass filter.

As shown in FIG. 8A, for points with approximately unit spacing, the reconstruction kernel is selected as a unit Gaussian, i.e., $V_k^r=I$. We decompose the symmetric matrix $M_k$ as follows:

$$M_k=Rot(\theta)\cdot\Lambda\cdot\Lambda\cdot Rot(\theta)^T, \quad (11)$$

where $$Rot(\theta) = \begin{bmatrix} \cos(\theta) & -\sin(\theta) \\ \sin(\theta) & \cos(\theta) \end{bmatrix} \text{ and } \Lambda = \begin{bmatrix} r_0 & 0 \\ 0 & r_1 \end{bmatrix}.$$

The rotation matrix R ($\theta$) includes the eigenvectors, and the scaling matrix $\Lambda$ includes the square roots of the eigenvalues of $M_k$. With a linear relationship $$u=Rot(\theta)\cdot\Lambda\cdot y; \quad (12)$$

we have $y^T y=u^T M^{-1}_k u$, and we can rewrite $G_{Mk}$ as $$G_{M_k}(Rot(\theta)\cdot\Lambda\cdot y) = \frac{1}{2\pi\cdot r_0 r_1}e^{-\frac{1}{2}y^T y} = \frac{1}{r_0 r_1}G_I(y). \quad (13)$$

Equation (13) represents a unit Gaussian in y, which is mapped to the elliptical Gaussian resampling filter using Equation (12) as shown in FIG. 8B. Because our alpha texture encodes the unit Gaussian, we rotate and scale a unit quadrilateral using Equation (12), and then apply the alpha texture to the deformed quadrilateral, yielding the elliptical resampling filter as a textured parallelogram.

Although the Gaussian resampling filter has infinite support, in theory, in practice it is determined only for a limited range of the exponent $\beta(y)=\frac{1}{2}y^T y$. Hence, we select a cutoff radius c such that $B(y) \leq c$, where a typical choice is c=1. Thus, the alpha texture actually encodes the unit Gaussian in the domain $$y \in \begin{bmatrix} -\sqrt{2c} \\ -\sqrt{2c} \end{bmatrix} \times \begin{bmatrix} \sqrt{2c} \\ \sqrt{2c} \end{bmatrix}.$$

Figure 9:
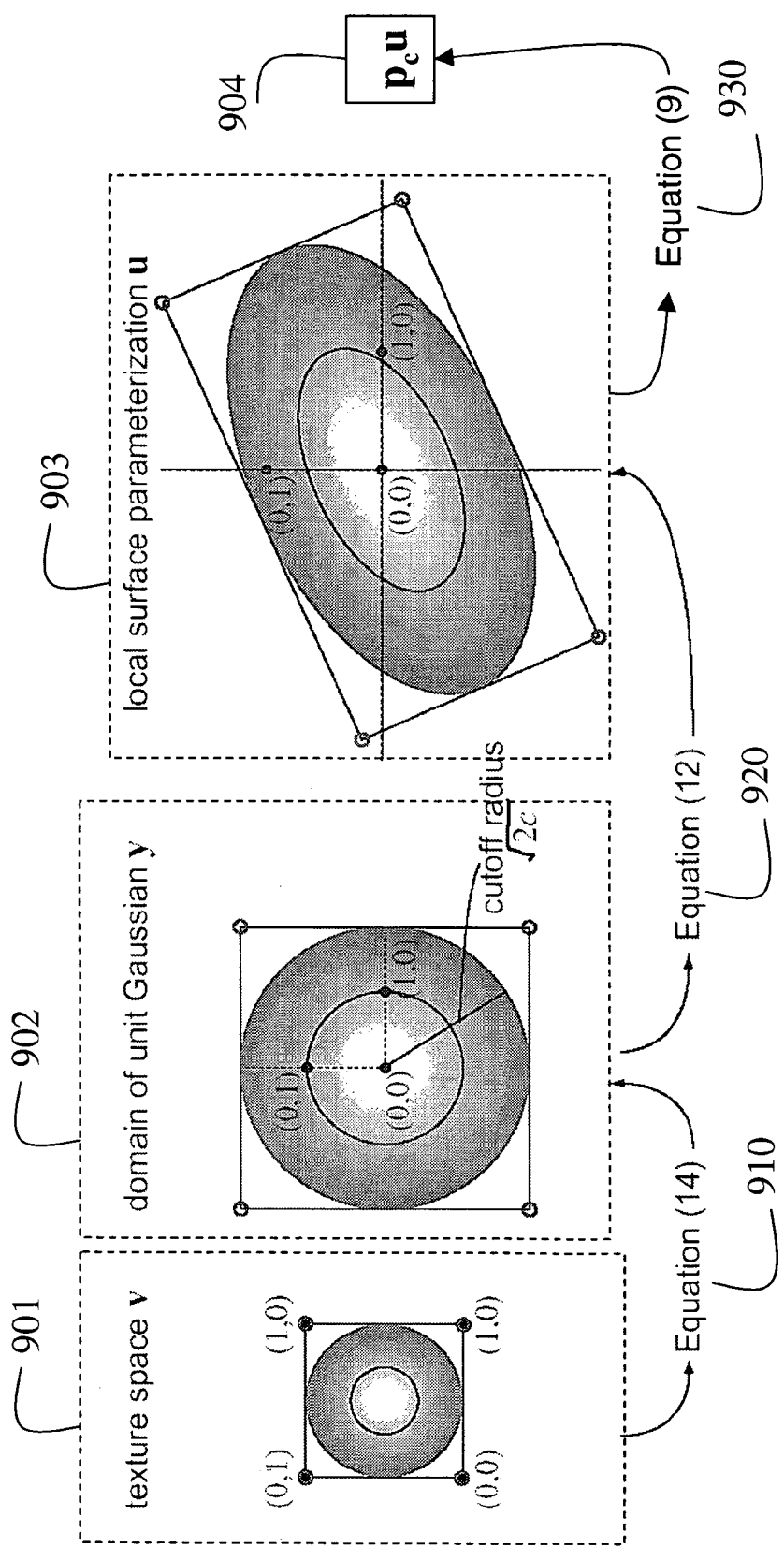
FIG. 9 is a diagram of constructing a texture mapped polygon representing an object space EWA resampling filter.

Each vertex v 901 has texture coordinates $\{(0, 0), (0, 1), (1, 1), (1, 0)\}$ to encode the vertex positions of the deformed quadrilateral and to perform texture mapping 910. Given vertex texture coordinates $v=(v_0, v_1)$ 901, we determined the camera space position $p^c u$ 904 as shown in FIG. 9.

First, we need to map 910 the texture coordinates v 901 to the coordinates y 902 in the domain of the unit Gaussian by scaling them according to the cutoff radius c:

$$y = 2\sqrt{2c}\left(\begin{bmatrix} v_0 \\ v_1 \end{bmatrix} - \begin{bmatrix} \frac{1}{2} \\ \frac{1}{2} \end{bmatrix}\right). \quad (14)$$

Then, we deform 920 the textured quadrilateral using Equation (12), yielding coordinates u 903 of the local surface parameterization. With Equation (9), we finally determine 930 the vertex positions $p^c u$ 904 of the parallelogram in camera space.

Determining Optimal Texture Size

To make full use of the eight bit precision of the alpha texture, we encode the non-constant part from Equation (13) in each texel, i.e., $g(y)=e^{-1/2 y^T y}$. Hence, the function range $[0, \ldots, 1]$ maps to the whole range $[0, \ldots, 255]$ of all texel values.

Although a larger texture size increases the precision of the discrete representation of the 2D Gaussian function, the quantization of the function values to eight bits leads to redundancy in high resolution alpha textures, because nearby texels can always map to the same quantized value.

We use a square texture with resolution len× len. Because the unit Gaussian function is rotation invariant, we can represent $g(y)$ as $g'(r)=e^{-1/2 r^2}$ in polar coordinates. To make full use of eight bits per texel, the following condition should be satisfied for all $r \in [0, \sqrt{2c}]$:

$$\left| \frac{d(g'(r))}{dr} \frac{\sqrt{2c}}{\frac{len}{2}} \right| = \left| r \cdot e^{-\frac{1}{2}r^2} \frac{\sqrt{2c}}{\frac{len}{2}} \right| \leq \frac{1}{2^8 - 1}. \quad (15)$$

From this, it follows that $$len \geq 510 \cdot \sqrt{2c} \cdot r \cdot e^{-\frac{1}{2}r^2}. \quad (16)$$

The optimal texture resolution corresponds to the smallest value of len that satisfies the above condition. For the typical choice c=1, we find len=438.

Implementation

Programmable Shader Computations

Our hardware accelerated surface splatting method is implemented using programmable vertex and pixel shaders. Programmable shaders provide efficient GPU level computing, see Lindholm, "A User-Programmable Vertex Engine," SIGGRAPH 2001 Proceedings, pages 149–158, 2001.

Vertex Shader Computations

During the first rendering pass, the depth offset along the view rays in camera space is determined using the vertex shader. In the second rendering pass, the vertex positions of the point polygon are also determined with the vertex shader. Due to the simple instruction set of the vertex shader, the implementation of the symmetric matrix decomposition in Equation (11) requires a careful design. We make most use of the two most powerful shader instructions, reciprocal square root (RSQ) and reciprocal (RCP). The details of these computation are described in Appendix A.

The constant part of Equation (13)

$$\frac{1}{2\pi \cdot r_0 \cdot r_1},$$

is output to the alpha channel of a diffuse color register. In this way, it can be accessed later by the pixel shader. Because vertex shaders do not support generating new vertices, we need to perform the same per vertex computation four times for each quadrilateral.

Pixel Shader Computations:

The determination of $W_k \rho_k(X)$ in Equation (2) is performed using the per-fragment processing of the pixel shader. The colors $W_r^k$, $W_g^k$, $W_b^k$ are retrieved from the red, green, and blue channel of the input register for the diffuse color. Multiplying the texel alpha value by the constant $$\frac{1}{2\pi \cdot r_0 \cdot r_1},$$

which is stored in the diffuse color register of the alpha channel, yields $\rho_k(X)$. Finally, the accumulation of the EWA splats in Equation (2) to form the output image 605 is performed by additive alpha blending 620, see FIG. 6.

Hierarchical Rendering

In our preferred embodiment, we use a point-based layered depth cube (LDC) tree for hierarchical rendering. However, other hierarchical data structures, such as bounding sphere hierarchy can be used.

While traversing the LDC tree from the lowest to the highest resolution blocks, we perform view-frustum culling of blocks, and backface culling using visibility cones. To select the appropriate octree level to be projected, we perform block bounding box warping. This enables us to estimate the number of projected points per pixel, facilitating progressive rendering.

For efficient hardware acceleration, the points of multiple LDC tree blocks are stored together in a number of large vertex buffers. This minimizes the switching of vertex buffers during rendering and enhances performance. The vertex buffers are allocated in the local memory of the graphics card or in accelerated graphics port (AGP) memory. Their sizes are selected to be optimal for the graphics rendering engine and to maximize performance. To access the vertex data of a block in the LDC tree, we store the corresponding vertex buffer ID and the start position of its vertex data in the vertex buffer.

Pre-Processing

Due to the irregular sampling of point-based models and the truncation of the Gaussian kernel, the basis functions $r_k$ in object space do not form a partition of unity in general. Neither do the resampling kernels in image space. To enforce a partition of unity, we could perform per-pixel normalization in the frame buffer after splatting. However, this post-processing operation is not supported by current graphics hardware. In addition, directly locking and accessing the frame buffer during rendering for per-pixel normalization slows down the rendering speed. But without normalization, the brightness of the final image varies with the accumulated filter weights, leading to visible artifacts. To solve this problem, we provide a pre-processing normalization step.

Point Normalization

If the basis functions $r_k$ in Equation (1) sum up to one everywhere, then applying a low-pass filter still guarantees that the resampling filters in image space form a partition of unity. Consequently, our pre-processing does not consider the prefiltering step during rendering and becomes a view independent process. The normalized view independent texture function in object space could be written as follows:

$$f_c(u) = \sum_{k \in N} w_k \hat{r}_k(u - u_k) = \sum_{k \in N} w_k \frac{r_k(u - u_k)}{\sum_{j \in N} r_j(u - u_j)}.$$

Unfortunately, the above rational basis function $\hat{r}_k$ invalidates the derivation of a closed form resampling filter. Instead, we use the sum of the weights at each point to approximate the above formula, yielding $$f_c(u) = \sum_{k \in N} w_k s_k r_k \cdot (u - u_k),$$

where $$s_k = \frac{1}{\sum_{j \in N} r_j(u_k - u_j)}.$$

We call $s_k$ the point's normalization weight, which is acquired by a view independent process described below. Based on Equation (7), we adjust our object space EWA resampling filter with the weight $s_k$, yielding:

$$\rho'_k(u) = s_k G_{V_k^r + J_k^{-1} J_k^{-1^T}}(u - u_k), \qquad (17)$$

which is the resampling filter used by object space EWA surface splatting with per-point normalization.

Acquiring Point Normalization Weights

To acquire a point's normalization weight, the point-sampled model is first rendered using our two pass method without pre-filtering and per-point normalization. Then the Z-buffer and the frame buffer are read back to acquire the normalization weights. In the third pass, we traverse the LDC tree to determine the depth value and the projected position in image space of the center point of each polygon.

Based on the Z-buffer information, the visible points are detected. After rendering, the alpha channel of each frame buffer pixel stores the sum of the accumulated contributions S from all EWA splats projected to that pixel. Hence, the visible point's normalization weight is $s_k = 1/S$. To capture the normalization weights for points invisible from one view, multiple-view weight capture is applied, which can be performed automatically or interactively.

For automatic capture, a bounding sphere is constructed around the point-based model. Then point weights are acquired from different view points which are uniformly distributed on the surface of the sphere. For interactive capture, the user manually specifies a part of the point model to be acquired. In both methods, the normalization weight of the same point can be acquired several times. To get rid of noise, we select the median value as the final normalization weight.

Per-point normalization assumes that the normalization weight is the same in the small neighborhood covered by the point's polygon. For each point, the normalization weight captured at the center of the point quadrilateral is copied to its polygon vertices during rendering. The above assumption is not true, however, at the edges of the point model. In this case, we acquire the normalization weight for each vertex of the point polygon. Thus, point quadrilaterals at edges have different normalization weights for each vertex.

In the acquisition process, direct rendering of point-based models can cause overflow in the alpha channel of frame buffer pixels where the accumulation of contributions from different splats is greater than one. In this case, the point normalization weight is incorrectly computed due to clamping in the alpha channel. To solve the problem, we use a global parameter γ to avoid overflow. In our implementation, the weight capture process uses the following object space texture function:

$$f_c(u) = \sum_{k \in N} \gamma w_k r_k(u - u_k).$$

By setting γ to a suitable value less than one, the accumulated contribution of the splats in a pixel is not too large to be clamped. Consequently, the image rendered during normalization weight capture is darker. A typical choice for γ=0.73, which works for most point models. For a normalization weight s'k, and a global parameter γ, the final point normalization weight is $s_k = s'_k\gamma$.

Effect of the Invention

Object space EWA surface splatting with per-point normalization is a desirable rendering method for high quality and interactive point rendering. It can handle several million points per second when object level culling is enabled. To improve the rendering quality further, we can combine per-point normalization and per-pixel normalization during progressive rendering. The point model is rendered by per-point normalization during user interaction, and refined by per-pixel normalization afterwards.

We also compare the performance of object space EWA surface splatting with a software implementation of image space EWA surface splatting. For a 512 output resolution, our method can render approximately 1.5 million antialiased splats per second. On the same PC, the software-only implementation of image space EWA surface splatting only renders up to 200,000 splats per second. The software renderer is also more sensitive to the output image resolution. When the image resolution is higher, the performance of the software method decreases linearly. In contrast, hardware accelerated object space EWA surface splatting is less sensitive to the output resolution.

The invention provides an object space formulation of EWA surface splatting for irregular point samples. Second, we provides a multi-pass approach to efficiently implement the method using vertex and pixel shaders of modem PC graphics hardware. We also provide a pre-processing method for proper normalization of the EWA splats.

Besides increased performance, there are other advantages of using GPUs for point based rendering. While CPUs double in speed every two years, GPUs increased their performance by a factor of 11 in the last nine months. Undoubtedly, GPU performance will continue to increase faster than CPU speed in the near future. Due to their fixed-function processing, there is more room for parallelization.

Because each point is processed independently, this will linearly increase the performance of our method. Furthermore, the performance of a software implementation of EWA surface splatting drops with increased output resolution, an effect that is not nearly as serious for our hardware based implementation. Finally, using the GPU leaves the CPU free for other tasks, such as coordinated audio processing.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

Symmetric Matrix Decomposition for Vertex Shader Implementation

We choose the follwing symmetric matrix decomposition method for our vertex shader implementation. $M_k$ is rewritten as follows:

$$M_k = Rot(\theta) \cdot \Lambda \cdot \Lambda \cdot Rot(\theta)^T = \begin{bmatrix} A & \frac{B}{2} \\ \frac{B}{2} & C \end{bmatrix}.$$

Then we define $$Sgn(x) = \begin{cases} -1, & x < 0 \\ +1, & x \geq 0. \end{cases}$$

The following variables are stored in the vertex shader temporary registers:

$p = A - C$ $q = A + C$ $t = Sgn(p)\text{sqrt}(p^2 + B^2).$

When those temporary variables, the scaling matrix can be computed as $$\Lambda = \begin{bmatrix} r_0 & 0 \\ 0 & r_1 \end{bmatrix} = \begin{bmatrix} \sqrt{\frac{(q+t)}{2}} & 0 \\ 0 & \sqrt{\frac{(q-t)}{2}} \end{bmatrix}.$$

Rot ($\theta$) can be computed, too If t=0, $$Rot(\theta) = \begin{bmatrix} 1 & 0 \\ 0 & 1 \end{bmatrix},$$

else if t≠0:

$$Rot(\theta) = \begin{bmatrix} \sqrt{\frac{t+p}{2t}} & -Sgn(Bp)\sqrt{\frac{t-p}{2t}} \\ Sgn(Bp)\sqrt{\frac{t-p}{2t}} & \sqrt{\frac{t+p}{2t}} \end{bmatrix}.$$

Square root and division operations in the above formulas can be computer efficiently using the vertex shader instructions "RSQ" and "RCP", respectively.

The invention claimed is:

1. A method for rendering a 3D model of a graphics object, the model including a plurality of points, comprising:
   centering a first polygon on each point of the plurality of points to produce a plurality of first polygons;
   rendering each first polygon as depth values in a depth image;
   centering a second polygon on each point of the plurality of points to produce a plurality of second polygons;
   adapting each second polygon to an associated object space EWA resampling filter; and
   rendering each adapted second polygon as an image according to the depth values in the depth image.

2. The method of claim 1 wherein the points are discrete and unconnected.

3. The method of claim 1 wherein the points are vertices in a polygon mesh.

4. The method of claim 1 wherein each point has a 3D location, a surface normal, and a color.

5. The method of claim 4 wherein the first polygon is perpendicular to the normal of the point and the first polygon is opaque.

6. The method of claim 1 further comprising:
   offsetting the first polygons from a surface of the model by a depth threshold along a viewing ray.

7. The method of claim 1 wherein the rendering of the first polygons uses means for rasterization in a graphics processing unit.

8. The method of claim 1 wherein the adapting further comprises:
   scaling and stretching the second polygons; and
   alpha blending the adapted second polygons.

9. The method of claim 1 further comprising:
   normalizing the image.

10. The method of claim 1 further comprising:
mapping an image space EWA resampling filter to an object space to obtain each object space EWA resampling filter.

11. The method of claim 1 wherein the rendering of the second polygons further comprises:
projecting the second polygons to an image space; and
rasterizing the projected second polygons.

12. The method of claim 1 wherein the rendering of the second polygons uses a vertex shader of a graphics processing unit.

13. The method of claim 1 further comprising:
dynamically determining view dependent point positions during rendering to avoid aliasing effects.

14. The method of claim 1 wherein the first polygon is a quadrilateral having a side length twice a maximum distance between the points.

15. The method of claim 6 wherein the depth threshold is an average distance between the points.

16. The method of claim 1 further comprising:
storing the points in a layered depth cube.

17. The method of claim 1 further comprising:
encoding, for each point, a discrete unit Gaussian basis function as an alpha texture;
stretching and scaling the texture to match the associated object space EWA resampling filter; and
applying the stretched and scaled texture to the second polygon.

18. The method of claim 1 further comprising:
convolving an object space basis function with a warped prefilter to obtain the object space EWA resampling filter.

19. An apparatus for rendering a 3D model of a graphics object, the model including a plurality of points, comprising:
means for centering a first polygon on each point of the plurality of points to produce a plurality of first polygons;
a depth buffer configured to store depth values obtained by rendering each first polygon;
means for centering a second polygon on each point of the plurality of points to produce a plurality of second polygons;
a vertex shader configured to adapt each second polygon to an associated object space EWA resampling filter; and
a pixel shader configured to render each adapted second polygon as an image according to the depth values in the depth buffer.

* * * * *